United States Patent [19]

Han

[11] Patent Number: 5,056,234
[45] Date of Patent: Oct. 15, 1991

[54] ROOFING TILE COURSE MARKING DEVICE

[76] Inventor: Curtis Han, 608 Hawthorne St., Unit A, Glendale, Calif. 91204

[21] Appl. No.: 538,153

[22] Filed: Jun. 14, 1990

[51] Int. Cl.⁵ .................. G01B 3/10; G01D 21/00
[52] U.S. Cl. ........................... 33/494; 33/759; 33/648
[58] Field of Search ............... 33/485, 492, 494, 758, 33/759, 760, 648, 646

[56] References Cited

U.S. PATENT DOCUMENTS

| | | | |
|---|---|---|---|
| Re. 14,947 | 9/1920 | Ballou | 33/758 |
| 1,170,521 | 2/1916 | Faison | 33/648 |
| 1,668,269 | 5/1928 | Faison | 33/648 |
| 1,677,821 | 7/1928 | Graham | 33/494 |
| 3,210,850 | 10/1965 | Grzyb | 33/759 |
| 4,149,320 | 4/1979 | Troyer et al. | 33/758 |
| 4,266,388 | 5/1981 | Flood | 33/648 |
| 4,301,596 | 11/1981 | Sedlock | 33/494 |
| 4,679,325 | 7/1987 | Sweatman | 33/494 |
| 4,845,858 | 7/1989 | Thomas | 33/494 |

Primary Examiner—Thomas B. Will
Attorney, Agent, or Firm—J. E. Brunton

[57] ABSTRACT

A device for use in laying out courses for the installation of roofing tile of various sizes and compositions produced by various manufacturers. The device includes an elongated tape having inscribed thereon coded indicia which can be used in laying out each course of tile produced by a particular manufacturer. The coded indicia identify a particular manufacturer and automatically account for the eave overhang and tile overlap distances specified by the manufacturer.

7 Claims, 1 Drawing Sheet

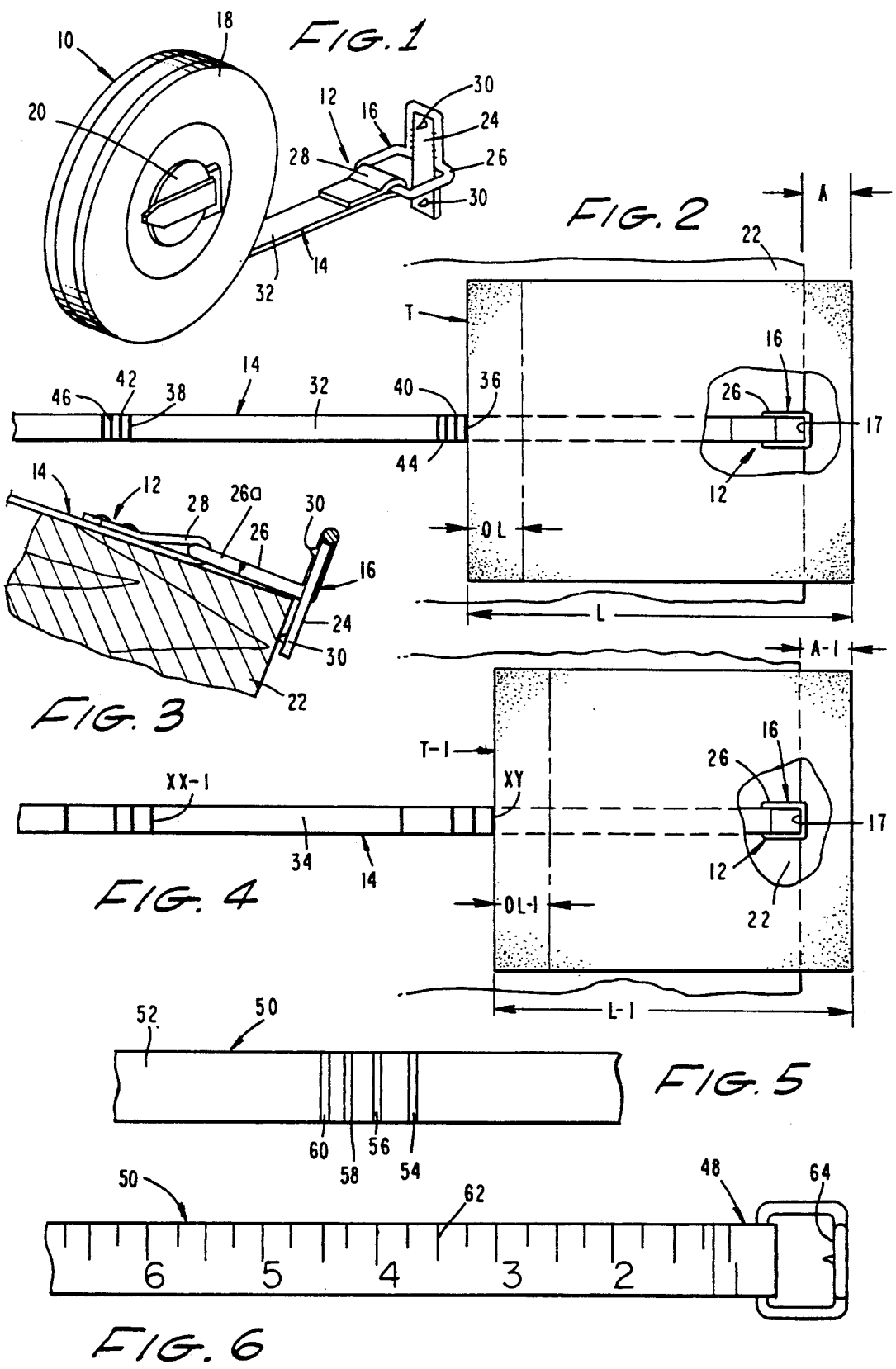

ROOFING TILE COURSE MARKING DEVICE

BACKGROUND OF THE INVENTION

1. Field of the Invention

The present invention relates generally to measuring devices. More particularly the invention concerns a device for use in laying out courses for the installation of roofing tile of various sizes and compositions produced by various manufacturers.

2. Discussion of the Invention

Roofing tile is widely used in many geographical locations and is becoming increasingly popular particularly in the sun-belt areas of the country. Typically roofing tile is constructed from red clay, concrete and various composite materials which usually use Portland cement as a binder. In the United States the majority of the roofing tile is manufactured by ten or twelve major producers each of which produces a tile of slightly different size, shape and composition.

The various tile manufacturers typically specify different eave exposures and tile overlays or overlaps. Accordingly, when a given roofing contractor is involved with installing roofing tile produced by several different manufacturers', tile course layout can be quite difficult and time consuming. For example, tile produced by one manufacturer can be 16½ inches in length while tile produced by another manufacturer can be 18¼ inches in length. The first manufacturer may specify a 1½ inch exposure off the eave edge and a 3 inch overlap. On the other hand, the second manufacturer may specify a 2 inch eave exposure and a 3 inch overlap. As will be better understood from the discussion which follows, these types of differences in tile installation make correct course layout difficult for the contractor that installs a number of different types of tile.

Before discussing the device of the present invention, a brief review of the standard prior art methods of installing roofing tile is perhaps in order. At the outset, it must be understood that no matter what the composition of the tile, the tile itself is not considered a water proof material. The object of a tile roof is to create a water shelving system in which tiles are methodically laid side by side and then overlapped to the given manufacturers specification to provide channels in which the water runs off the roof. This being the case correct tile course layout is of extreme importance.

In accordance with standard prior art practice, once the roof has been felted and the required metal flashing is in place, course layout can begin. Initially the location of the first, or "A", course is determined. This is done by measuring the length of the tile to be installed and then subtracting the specified eave exposure or overhang of the tile over the edge of the roof. For example, if the tile is 17 inches long and the specified eave overhang is 2 inches, the mark for the first course is made 15 inches from the edge of the roof. In laying out subsequent courses, the specified overlap is subtracted from the tile length to give the distance from the "A" course mark to the second course mark. For example, if the tile is 17 inches long and the specified overlap is 3 inches, the second course mark would be made 14 inches from the "A" course mark. All subsequent courses would them be marked at 14 inch intervals until the top of the roof is reached. Typically this marking is done by the roofer using a standard steel tape. Marks are made about every 15 feet along the length of the roof and then course marks are connected using a chalk line.

From the foregoing it is apparent that different course layout measurements are required for the installation of tiles produced by each of the different tile manufacturers. This makes the task of "A" course and subsequent courses distance calculations and course layout marking extremely tedious and time consuming.

The apparatus of the present invention overcomes the drawbacks of prior art roofing tile course layout methods by providing a unique, universal marking device for use in conjunction with the installation of roofing tiles of a variety of styles, shapes and composition. In one form of the invention, the device comprises an elongated thin tape having several series of indicia provided thereon, each series being adapted for the expeditious marking of tile courses for a particular tile manufactured by a specific manufacturer. More particularly a first indicia of a selected series of indicia indicates the position of the first or "A" course, a second indicia indicates the position second course, a third indicia indicates the position of the third course and so on. A second series of indicia, as for example a series of marks on the tape of a different color from the marks comprising the first series of indicia, are adapted for use in laying out courses for the installation of a tile of a different size and configuration manufactured by a different manufacturer. Different tile producers can be identified by applying marks to the tape which are of different colors or through the use of letters or symbols identifying particular manufacturers.

SUMMARY OF THE INVENTION

It is an object of the present invention to provide a device for use in accurately and expeditiously laying out tile course for the installation of a number of different type of roofing tiles.

It is another object of the invention to provide a device of the aforementioned character which includes an elongated tape having inscribed thereon coded tile producer indicia indicating the positions of each course of tile as specified by the different producers.

Another object of the invention is to provide a device as described in the preceding paragraph in which the indicia automatically accounts for both the eave overhang and the tile overlap specified by the producer of the particular tile with which the coded indicia is associated.

Still another object of the invention is to provide a course layout device which includes a layout tape having indicia marked on both sides of the tape. For example, layout indicia corresponding to particular tile manufacturers can be provided on one side of the tape while a standard rule is provided on the opposite side of the tape.

Another object of the invention is to provide a device of the class described which is easy to use, is readily portable and is inexpensive to manufacture.

BRIEF DESCRIPTION OF THE DRAWINGS

FIG. 1 is a generally perspective view of the roofing course layout device of the present invention.

FIG. 2 is a fragmentary top plan view of a portion of the elongated tape assembly of the device of the invention.

FIG. 3 is a greatly enlarged, fragmentary side elevational view of the free end portion of the tape assembly showing the manner in which the device is removably connected to the edge of a roof.

FIG. 4 is a top plan view similar to FIG. 2 but showing the appearance of the underside of the elongated tape portion of the tape assembly shown in FIG. 2.

FIG. 5 is an enlarged fragmentary view of a portion of the tape component of a second form of the device of the present invention.

FIG. 6 is a fragmentary view of the opposite side of the tape component of the second embodiment of the invention.

DESCRIPTION OF THE INVENTION

Referring to the drawings and particularly to FIGS. 1, 2 and 3, one form of the roofing tile course layout device of the present invention is there illustrated and generally designated by the numeral 10. The device of this form of the invention comprises a tape assembly 12 which includes an elongated, flat tape 14 and a gripping means 16 for releasably gripping the edge of the roof. An enclosure means shown here as a housing 18, is provided for storing the tape there within in a coiled configuration. Housing 18 is of a character similar to that typically found in a retractable type surveyor's tape having a cranking handle 20 for use in retracting the tape into a coiled configuration within the housing and winding it about an internally disposed spool.

In the embodiment of the invention shown in FIGS. 1 through 4 of the drawings, the gripping means 16 comprises an elongated plate-like member 24 which is connected to a metal loop 26, the in-board portion 26a of which is received within a folded over edge portion 28 of tape 14. (FIG. 3) Provided at the upper and lower portions of plate 24 are pin-like protruberances 30 which are adapted to be partially embedded into the edge of the roof in the manner shown in FIG. 3. As will presently be described, the gripping means of the device can be used to position the tape with either the top or bottom surface of the tape being visible when the tape is extended along the roof.

Turning particularly to FIGS. 2 and 4, it can be seen that tape 14 is provided with indicia on both the upper and lower surfaces 32 and 34 thereof. When the tape is extended along the roof in the manner shown in FIG. 2, the indicia provided on the top surface 32 of the tape are visible. When the tape is inverted and extended along the roof in the manner shown in FIG. 4, the indicia provided on the bottom surface 34 of the tape are visable.

The apparatus of the invention is particularly useful in installing several different types of tile manufactured by several different manufacturers, each specifying different overlaps and eave overhangs. By way of example, the device can be used to install a multiplicity of first, second and third types of tile of differing configurations, the first tile having a first tile length, a first eave overhang distance and a first overlap distance; the second tile having a second tile length, a second eave overhang distance and a second overlap distance; and a third tile having a third tile length, a third overhang distance and a third overlap distance. For purposes of illustration, a first type of tile T is shown in position on the roof 22 with the first overhang distance of this particular tile being designated in FIG. 2 by the letter A. The length of the tile T, as shown in FIG. 2, is designated by the letter L, while the overlap distance specified by the manufacturer of tile T is designated by the letters OL.

Referring to the left-hand portion of FIG. 2, the upper or first surface 32 of the tape 14 can be seen to be provided with a series of spaced apart indicia, including spaced apart first indicia. The first indicator, or mark 36, of the series of first indicia is located from the first end 17 of tape assembly 12 a distance equal to the length L of the first tile T minus the first overhang distance A. A second indicator, or mark 38 of the first series of indicia, is located from first indicator 36 a distance equal to the length of the first tile T minus the first overlap distance OL. At least third and fourth indicators (not shown) of the first series of indicia would also be provided on surface 32 of the tape, each indicator being spaced apart by a distance equal to the length of the first tile L minus the first overlap distance OL.

A series of second indicia are also marked on surface 32 of tape 14. The first indicator 40 thereof being located from first end 17 of the tape assembly a distance equal to the second length of the second tile minus the second overhang distance specified by the manufacturer of the second tile. The series of second indicia also includes a second indicator 42 which is located from the first indicator a distance equal to the length of the second tile minus the second overlap distance specified by the manufacturer of the second tile. As was the case with the series of first indicia, at least third and fourth indicators of the series of second indicia (not shown) are spaced apart by a distance equal to the length of the second tile minus the second overlap distance specified by the manufacturer of the second tile.

Also marked on the first surface 32 of tape 14 is a series of third indicia including a first indicator 44 of said third indicia located from first end 17 of the tape assembly 12 of the device a distance equal to the third length of the third tile minus the third overhang distance specified by the manufacturer of the third tile. A second indicator 46 of the series of third indicia is located from the first indicator 44 a distance equal to the length of the third tile minus the third overlap distance specified by the manufacturer of the third tile. In similar fashion, the series of third indicia include at least third and fourth indicators (not shown) being spaced apart by a distance equal to the length of the third tile minus the third overlap distance specified by the manufacturer of the third tile.

In the preferred form of the invention, the indicators of the series of first, second and third indicia are provided in the form of transversally extending marks of different colors. It is to be understood that other indicia such as numbers or letters can be used to identify the various producers of the differently configured tiles. Additionally, as illustrated in FIG. 4, the various indicators, or marks, can be associated with letters such as XY further identifying particular tile manufacturers. For example, the letters rather than being XY could comprise an abbreviation of the company name or could comprise a logo of a particular company manufacturing the tile with which the identified indicia are associated.

As indicated in FIG. 4, the apparatus of the invention shown in FIGS. 1 through 4 comprises a double-sided tape with side 34 of the tape being visible in FIG. 4. In this form of the invention, additional series of indicia, each comprising at least first, second, third and fourth indicators, are inscribed on the second surface 34 of the tape. It is apparent that in the present form of the invention, series of indicia representing a large number of different manufacturers can be inscribed on the first and second surfaces 32 and 34 of the tape portion of the device. This enables the device to be used in laying out courses for a large number of different tile manufacturers by simply turning the tape over to locate the indicia which corresponds to the particular tile being installed on a given job.

In using the device of the first form of the invention, the color coded, or otherwise coded, indicia of a particular manufacturer is first located. As previously mentioned, the selected indicia can be located on either surface 32 or 34 of tape 14. The tape is then positioned with the gripping means 16 affixed to the edge of the roof 22 so that the side of the tape having the selected indicia is visible. Assuming, for example, that the tile being installed on the particular job is the tile T, (FIG. 2) a first course mark would be placed corresponding to mark 36 on the tape. This mark would represent the alignment line for the first course of tile T. The tape would then be extended and a second mark 38 would be applied to the roof. Mark 38 would represent the location of the upper end of the second tile, the first end thereof being in an overlapping orientation relative to the first tile. In similar fashion, marks would be made on the roof corresponding to the third, fourth, fifth and sequentially appearing indicators provided on surface 32 of the tape.

If the indicia identifying by color or otherwise the tile manufacturer of the tile being installed is inscribed on the second surface 34 of the tape, the tape would be positioned in the manner illustrated in FIG. 4 with the second surface 34 of the tape being visible. For example, if the tile being installed was a tile T-1, this tile would have an overall length L-1, an eave overhang A-1 and an overlap OL-1. In installing tile T-1, a mark would be made on the roof corresponding to mark XY (designating tile manufacturer XY). The tape would then be extended and a mark made on the roof corresponding to the mark XY-1 (FIG. 4) which would represent the upper edge of the second course of tile T-1 with the proper overlap OL-1 of the first tile as specified by the manufacturer of the tile.

Turning to FIGS. 5 and 6, another form of the roofing tile course layout device of the present invention is there illustrated. This apparatus is similar in many respects to the apparatus shown in FIG. 1 and includes a tape assembly 48 comprising an elongated tape 50 housed within an appropriate enclosure (not shown) preferably of the character illustrated in FIG. 1. In this form of the invention, however, tape 50 is provided with a first surface 52 upon which is inscribed indicators or marks 54, 56, 58, and 60 which comprise indicators of series of first, second, third and fourth indicia representing four particular tile manufacturers. Once again, the indicators or marks may be color coded to identify a particular manufacturer, or they may include indicia in the form of letters, logos or the like identifying particular producers of tile of given configurations.

Turning to FIG. 6, the opposite side of tape 52, generally designated by the numeral 62, rather than being provided with series of indicia representing particular tile manufacturers, is provided with indicia representing sequential increments of distance from the first end 64 of the tape assembly 48. In the form of the invention shown in FIG. 6, the increments of distance are represented by inches and one-quarter of an inch.

Having now described the invention in detail in accordance with the requirements of the patent statutes, those skilled in this art will have no difficulty in making changes and modifications in the individual parts of their relative assembly in order to meet specific requirements or conditions. Such changes and modifications may be made without departing from the scope and spirit of the invention, as set forth in the following claims.

I claim:

1. A roofing tile course layout device for use in installing a multiplicity of first, second and third tile of differing configurations, said first tile having a first length, a first eave overhang distance and a first overlap distance, said second tile having a second tile length, a second eave overhang distance, and a second overlap distance, and said third tile having a third tile length, a third overhang distance, and a third overlap distance, said device comprising a tape assembly having a first end and including an elongated thin tape having:

(a) a series of first indicia, a first indicator of said series of first indicia being located a distance from said first end of said tape assembly equal to said length of said first tile minus said first overhang distance; a second indicator of said series of first indicia being located a distance from said first indicator equal to said length of said first tile minus said first overlap distance; and at least third and fourth indicator of said series of first indicia being spaced apart by a distance equal to said length of said first tile minus said first overlap distance;

(b) a series of second indicia, a first indicator of said series of second indicia being located a distance from said first end of said tape assembly equal to said second length of said second tile minus said second overhang distance; a second indicator of said series of second indicia being located a distance from said first indicator equal to said length of said second tile minus said second overlap distance; and at least third and fourth indicators of said series of second indicia being spaced apart by a distance equal to said length of said second tile minus said second overlap distance; and (c) a series of third indicia, a first indicator of said series of third indicia being located a distance from said first end of said tape assembly equal to said third length of said third tile minus said third overhang distance; a second indicator of said series of third indicia being located a distance from said first indicator equal to said length of said third tile minus said third overlap distance; and at least third and fourth indicators of said series of third indicia being spaced apart by a distance equal to said length of said third tile minus said third overlap distance.

2. A device as defined in claim 1 in which said tape includes first and second surfaces.

3. A device as defined in claim 2 in which said series of first indicia and said series of second indicia are provided on said first surface of said tape and in which said series of third indicia is provided on said second surface of said tape.

4. A device as defined in claim 2 in which said series of indicia are provided on said first surface of said tape and in which said second surface of said tape is provided with indicia representing sequential increments of distance from said first end of said tape.

5. A device as defined in claim 4 in which gripping means for gripping the edge of the roof are provided proximate said first end of said tape.

6. A device as defined in claim 5 in which said gripping means comprises an elongated plate connected to said tape and having a first portion extending from said first side of said tape and a second portion extending from said second side of said tape.

7. A devise as defined in claim 5 in which said indicators of said series of first indicators of said series of first indicia comprise marks of a first color, in which said indicators of said series of second indicia comprise marks of a second color and in which said indicators of said series of third indicia comprise marks of a third color.

* * * * *